H. ALLES.
CURRENT MOTOR.
APPLICATION FILED MAR. 30, 1921.

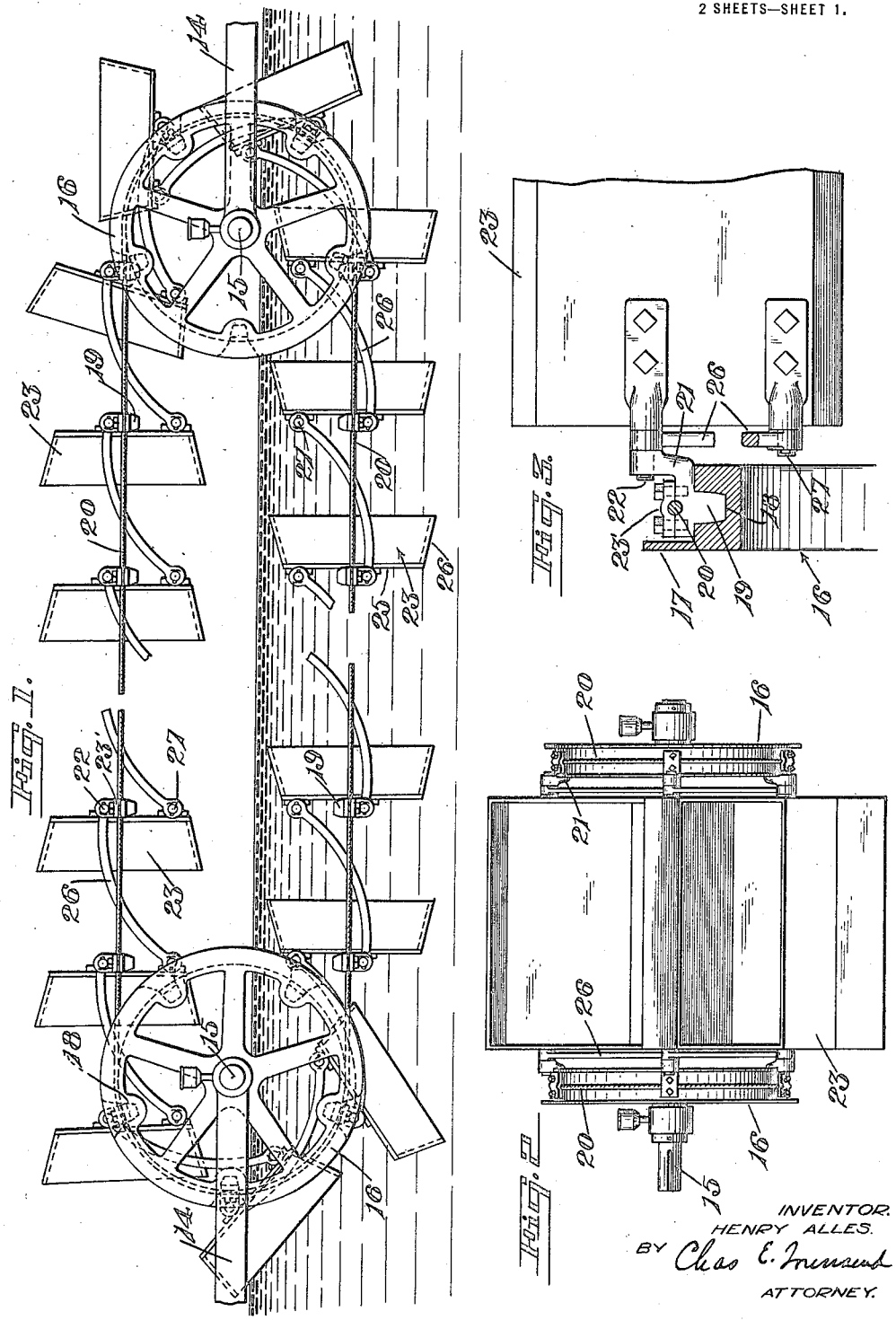

1,432,271.

Patented Oct. 17, 1922.
2 SHEETS—SHEET 2.

INVENTOR.
HENRY ALLES.
BY Chas. E. Townsend
ATTORNEY.

Patented Oct. 17, 1922.

1,432,271

UNITED STATES PATENT OFFICE.

HENRY ALLES, OF SAN FRANCISCO, CALIFORNIA.

CURRENT MOTOR.

Application filed March 30, 1921. Serial No. 457,011.

*To all whom it may concern:*

Be it known that I, HENRY ALLES, a citizen of the United States, residing at San Francisco, in the county of San Francisco and State of California, have invented new and useful Improvements in Current Motors, of which the following is a specification.

This invention relates to means for deriving power from a flowing stream, and particularly pertains to a current motor.

It is the principal object of the present invention to provide a motor structure which may be disposed across the path of a running stream in a manner to be influenced by the force of the current and to convert this force into useful power, all of which mechanism is inexpensive in construction and simple and direct in action.

The present invention contemplates the use of parallel endless cables led around pulleys, said cables supporting a plurality of impulse blades connected in a manner to properly present them to the force of the current as the cables move under the impetus of the blades.

The invention is illustrated by way of example in the accompanying drawings, in which:

Figure 1 is a view in side elevation showing the present invention, with parts broken away for the sake of convenience.

Fig. 2 is a view in end elevation showing the manner in which the cables and sheaves are assembled.

Fig. 3 is an enlarged fragmentary view showing the driving connection between a sheave and cable.

Figure 4:
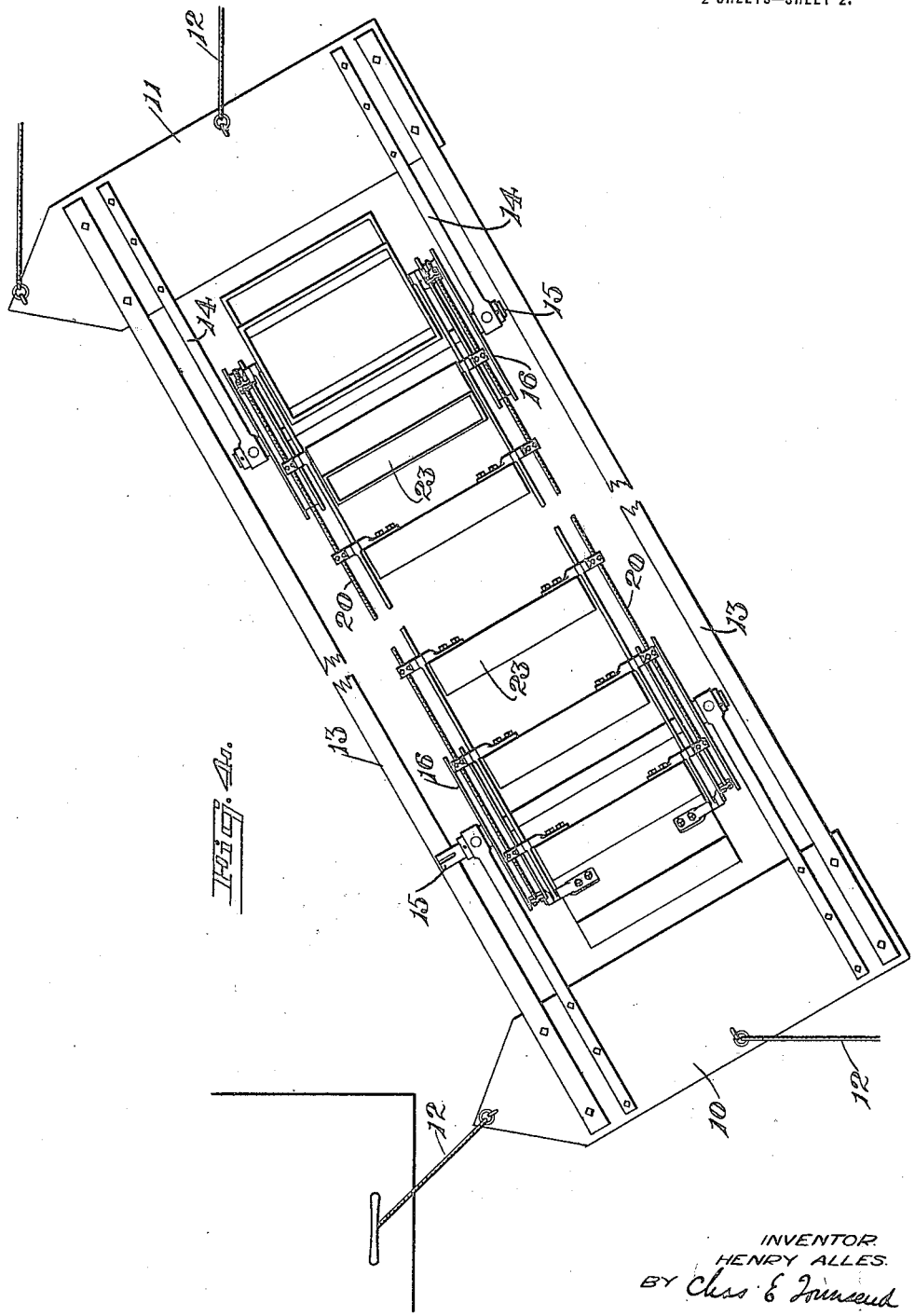
Fig. 4 is a view in plan illustrating the application of the present invention.

Referring more particularly to the drawings, 10 and 11 indicate pontoons which are spaced in parallel relation to each other and may be suitably anchored by cables 12. These pontoons are rigidly connected by cross beams 13, thus providing a floating structure for the current motor mechanism. Mounted upon the pontoons are bearing members 14 which rotatably support parallel shafts 15. The shafts are free to rotate within the bearings and carry the cable sheaves or sprockets 16. One of these members is fixed to the shaft at a point near each of the bearings. These sheaves are formed with a flanged rim 17 around the felloe of which indentations 18 are formed. These cavities are spaced equidistant around the sheaves and serve as pockets into which lugs 19 may extend. The lugs 19 are bolted at equal intervals along parallel cables 20, one of which cables passes over each aligned pair of sheaves. The lugs 19 are in the form of gear teeth, which will mesh with the pockets 18 in the sheaves and will thus provide positive driving engagement for the cables. As shown in Fig. 3 the lugs 19 are formed as a part of mountings 21 which are pivotally secured to pins 22. These pins are fixed to the back of impeller blades 23. Thus when the members 21 are bolted to the cables 20 by the plates 23 the impeller blades will be pivotally suspended between the cables. The pins are secured to the backs of blades at points substantially midway their heights.

The impeller blades may be of any preferred design, although in the present instance they are shown as being bucket-shaped, that is, they are formed with a vertical blade portion 25 around the edges of which a flange 26 extends. This provides an open mouth into which the water flows and which will confine the current within the buckets while exerting a pressure against the vertical blades.

In order to rigidly hold the blades in their upright positions during operation and to permit them to swing around the sheaves, links 26 are provided. These links are pivoted at one end to the pins 22 and at the opposite ends to pins 27. These latter pins are secured to the backs of blades and near the lower edges thereof. While the blades are moving along their horizontal paths of travel the links will hold them in parallel vertical positions, but as the blades pass around the sheaves the links will permit them to swing as required by this movement.

In the operation of the present invention the current motor is set up as indicated in the drawings, and is preferably disposed diagonally across a stream of flowing water. This will set the blades at an inclination to the direction of flow of the current and will cause them to be forced aside, thus imparting motion to the cables 20 and transmitting power through means of the positive engagement of the cable 20 with the sheaves.

While I have shown the preferred form of my invention, as now known to me, it will be understood that various changes might be made in the combination, construction and arrangement of parts by those skilled in the art, without departing from the spirit of the invention as claimed.

Having thus described my invention, what I claim and desire to secure by Letters Patent is:

1. A current motor comprising a pair of parallel shafts, pairs of sheaves secured upon each of said shafts and adapted to extend into the water from which power is derived, said sheaves being formed with pockets at equal intervals around their circumferences, endless cables led around complementary pairs of sheaves, lug members secured to said cables whereby they may register with the pockets of the sheaves, impeller blades disposed between the cables, and means associated with said lug members for pivotally supporting said impeller blades from the cables.

2. A current motor comprising a pair of parallel shafts, pairs of sheaves secured upon each of said shafts and adapted to extend into the water from which power is derived, said sheaves being formed with pockets at equal intervals around their circumferences, endless cables led around complementary pairs of sheaves, lug members secured to said cables whereby they may register with the pockets of the sheaves, impeller blades disposed between the cables, and means associated with said lug members for pivotally supporting said impeller blades from the cables, and means pivotally connecting the lug members and the lower ends of the impeller blades whereby said blades will be held in vertical positions during their horizontal movement.

3. A current motor comprising a pair of parallel shafts, co-operating pairs of sheaves secured on each of said shafts and adapted to extend into the water from which power is derived, said sheaves being formed with pockets at equal intervals around their circumferences, endless cables led around complementary pairs of sheaves, lug members secured to said cables at equal distances apart and adapted to register with and engage the pockets of the sheaves to produce a positive engagement between the cables and the sheaves, impulse blades having pins projecting from their sides at their centers, said pins journalled in said lug members for pivotally supporting said blades, and connecting links pivotally connected to the lug members of one blade and to a point adjacent the top of the adjacent blade whereby the blades will be held in vertical positions during their horizontal movement.

HENRY ALLES.